(No Model.)

F. GRINNELL.
AUTOMATIC FIRE EXTINGUISHER.

No. 399,523. Patented Mar. 12, 1889.

Attest:
Wm Burnett
J George Seltzer

Inventor:
Frederick Grinnell
By Knight Bros.
Attys.

UNITED STATES PATENT OFFICE.

FREDERICK GRINNELL, OF PROVIDENCE, RHODE ISLAND.

AUTOMATIC FIRE-EXTINGUISHER.

SPECIFICATION forming part of Letters Patent No. 399,523, dated March 12, 1889.

Application filed March 9, 1888. Serial No. 266,727. (No model.)

*To all whom it may concern:*

Be it known that I, FREDERICK GRINNELL, of Providence, Providence county, Rhode Island, have invented a new and useful Improvement in Automatic Fire-Extinguishers, of which the following is a specification.

The object of this invention is to protect from corrosion, accumulations of dirt, &c., some or all of those parts of an automatic fire-extinguisher which are designed to be operated by the heat of the fire to release the water or other extinguishing agent.

In my present invention I accomplish this by placing such heat-actuated parts in the passage or chamber of the extinguisher that communicates with the supply-pipe, and which is closed by a valve or cap, the said valve or cap being held from within by the said heat-actuated parts.

The invention is more particularly applicable to what is known as the "dry-pipe system" of automatic fire-extinguishers, as in such a system the extinguishers are entirely free of water normally, and are therefore almost as sensitive with the heat-actuated device inside as when it is placed outside; but even in a wet-pipe system the extinguishers may be so arranged as to have a small amount of air trapped within them by the water, so as to protect the thermal device from the cooling action of the water. The same would apply to a dry-pipe system when the water is let into the pipes by the opening of an extinguisher. The simplest way to effect this is to place the extinguishers above the pipes; but there are other obvious ways of accomplishing the same result.

My invention also consists of minor improvements, hereinafter described and claimed.

Figure 1:
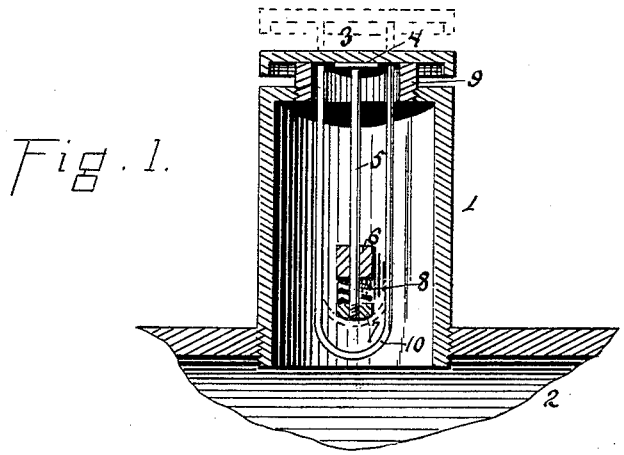
Figure 2:
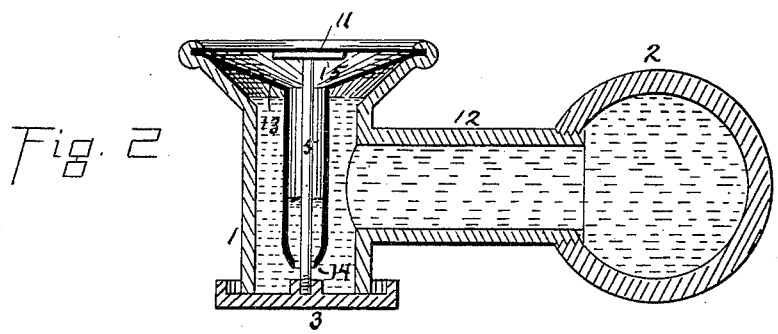
Figure 3:
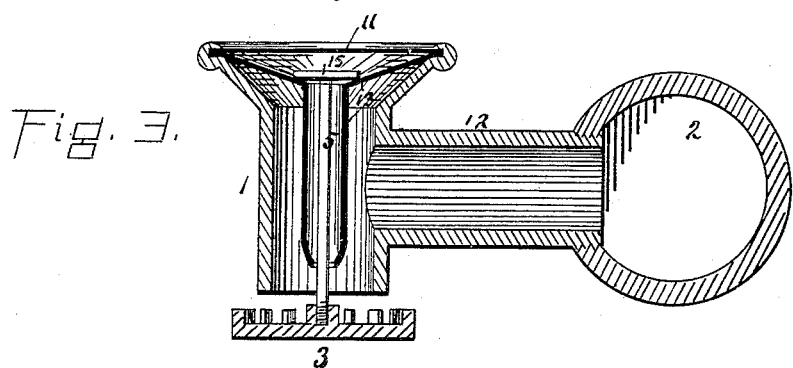

In the accompanying drawings, Figure 1 represents a sectional view of a simple form of extinguisher, showing the valve held internally, according to my invention. Figs. 2 and 3 are sectional views, showing a modified form of the extinguisher in its closed and opened positions, respectively.

The extinguisher-chamber 1 is fitted into the water-supply pipe 2, and its discharge-outlet is closed by a valve, 3. The valve is held closed by being soldered at the point 4 to the stem 5, the solder being of a kind that will release the parts upon the occurrence of abnormal heat. The stem 5 passes through a cross-piece, 6, secured to the chamber 1, and a nut, 7, screwed into the stem serves to adjust the valve to its seat and hold it there. A spring, 8, may be interposed between the nut and the cross-piece, so as to give a yielding pressure on the valve. I may also use in connection with this device a valve-seat or ring, 9, of heat-insulating material, so as to prevent the heat being conducted away too rapidly from the soldered joint to the water.

The valve may be extended, as shown, to form a deflector for the water when it is open, and to hold it at a proper distance from the outlet it may be provided with guide-links 10, adapted to catch upon the cross-piece 6 when the valve is thrown open, and thus hold the deflector.

In Figs. 2 and 3 I have shown a modification of my invention, in which the valve 3 opens downward and is held to its seat by being connected by stem 5 to a flexible diaphragm, 11, the pressure in the pipes acting against the diaphragm serving to draw up the valve and hold it closed with a force always proportioned to and in excess of the force tending to open the valve.

The extinguisher-chamber shown in Figs. 2 and 3 consists of a body, 1, having a neck, 12, which may be screwed into the supply-pipe 2, as shown. The upper part of the body is flared outwardly, as shown, and to its upper edge is secured the flexible diaphragm 11, the joint between the two being made air-tight. The soldered joint is made at the point 4 between the stem and the diaphragm, the other end of the stem being screwed into the valve. Extending downward around the stem 5 is a partition, 13, the same forming an air-chamber inclosing the soldered joint and protecting it from the water, which otherwise might be thrown against it. The partition may be contracted at the point 14, where it opens into the extinguisher-chamber, so as to still further prevent the free access of water without preventing the pressure of the water from acting upon the air in the said air-chamber, so as to force out the diaphragm. The diaphragm should be made larger than the valve, so as to more than balance the pressure against the valve.

When the soldered joint is released by heat, the cross-piece 15 at the top of the stem will prevent the valve from opening more than a limited distance by catching against the inside of the partition 13.

When the water is let into the pipes, the air-chamber will form an air-trap, as shown in Fig. 2, thus protecting the soldered joint from the cooling action of the water. Instead of the soldered joint I may use any other form of heat-actuated device, the invention relating solely to the means of protecting such devices, and not to the devices themselves.

I claim—

1. An automatic fire-extinguisher having a chamber communicating with the supply-pipe, a valve closing a discharge-outlet, and a heat-actuated device located entirely within the chamber and adapted to cause the opening of the valve when the temperature rises above the normal.

2. The combination, in an automatic fire-extinguishing apparatus, of a water-pipe, a valve closing an outlet from said pipe, an air-chamber communicating with the water-pipe, the said air-chamber being located so as to have air trapped within it by the water, and a heat-actuated device located in the said air-chamber and connected with the said outlet-valve, so that the said valve will be released by the heat-actuated device when the temperature rises above a predetermined point, as set forth.

3. An automatic fire-extinguisher having a chamber communicating with the supply-pipe, a valve closing an outlet and held closed against the pressure from within by a heat-actuated device located entirely within the chamber, the said device being attached to a yielding or movable part of the said chamber, so as to cause the internal pressure to hold the valve closed.

4. An automatic fire-extinguisher having a chamber communicating with the supply-pipe, a valve closing an outlet, a flexible diaphragm in the wall of said chamber, and the heat-actuated device in the chamber connecting the diaphragm and the valve, for the purpose set forth.

5. The combination, in an automatic fire-extinguisher, of an extinguisher-chamber communicating with the supply-pipe, an air-chamber leading into the extinguisher-chamber, a valve closing an outlet, and a heat-actuated device located in said air-chamber and controlling the valve.

6. The combination, in an automatic fire-extinguisher, of an extinguisher-chamber communicating with the supply-pipe, an air-chamber located within the extinguisher-chamber, the said air-chamber having an inlet from the extinguisher-chamber, a valve closing an outlet, and a heat-actuated device in said air-chamber controlling the valve.

7. The combination, in an automatic fire-extinguisher, of an extinguisher-chamber communicating with the supply-pipe, an air-chamber leading into the extinguisher-chamber through a contracted inlet, a valve closing an outlet for the water, and a heat-actuated device located in said air-chamber and controlling the valve.

FREDERICK GRINNELL.

Witnesses:
W. H. THURSTON,
S. J. MURPHY.